(No Model.)
2 Sheets—Sheet 1.
G. & E. ASHWORTH.
DRIVING MECHANISM FOR CARDING ENGINES.
No. 403,721.
Patented May 21 1889.
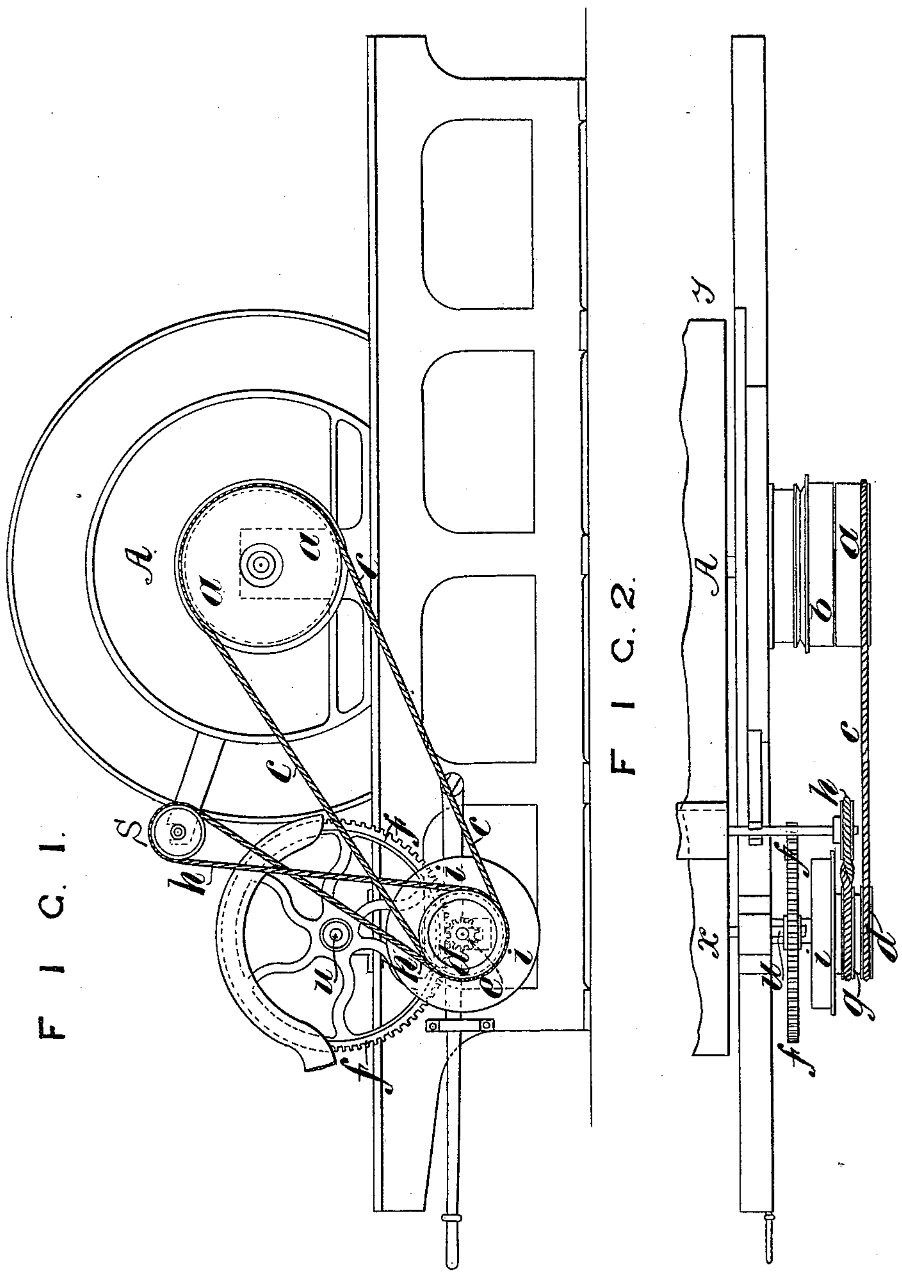
Witnesses.
E. J. Griswold
Geo. A. Crane.
INVENTORS.
G. & E. Ashworth.
By their Attorneys Howson and Howson
N. PETERS. Photo-Lithographer, Washington, D. C.

(No Model.)
2 Sheets—Sheet 2.
G. & E. ASHWORTH.
DRIVING MECHANISM FOR CARDING ENGINES.
No. 403,721. Patented May 21 1889.
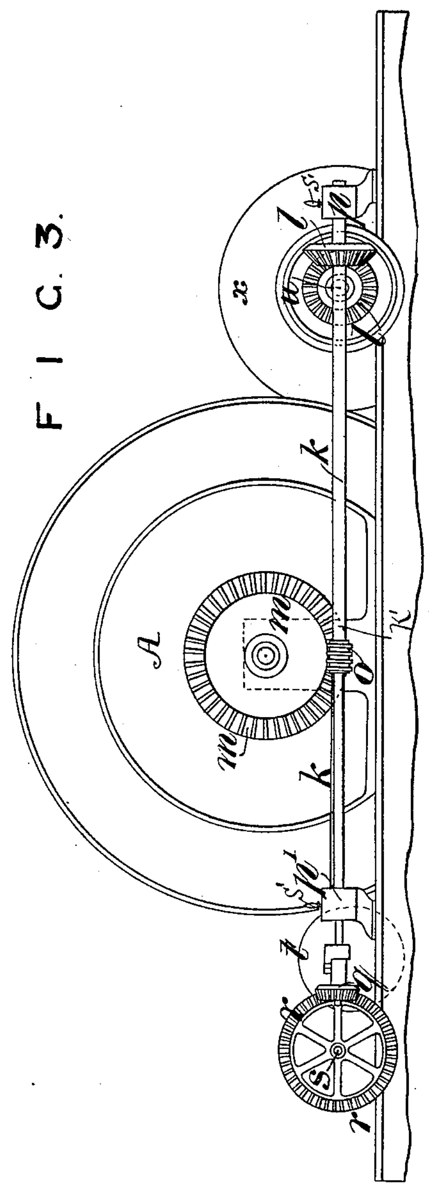
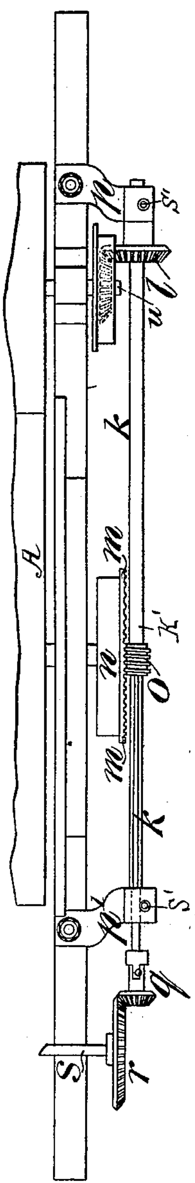
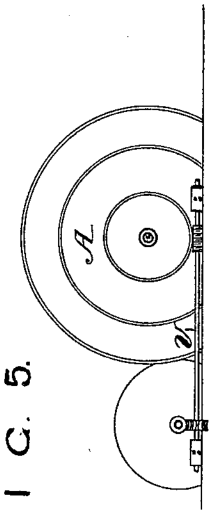
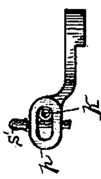
Witnesses
E. J. Griswold
Geo. A. Crane.
INVENTORS.
G. & E. Ashworth.
By their Attorneys Howson and Howson
N. PETERS, Photo-Lithographer, Washington, D. C.

UNITED STATES PATENT OFFICE.

GEORGE ASHWORTH AND ELIJAH ASHWORTH, OF MANCHESTER, COUNTY OF LANCASTER, ENGLAND.

DRIVING MECHANISM FOR CARDING-ENGINES.

SPECIFICATION forming part of Letters Patent No. 403,721, dated May 21, 1889.

Application filed February 23, 1888. Serial No. 264,975. (No model.) Patented in England May 18, 1886, No. 6,639.

*To all whom it may concern:*

Be it known that we, GEORGE ASHWORTH and ELIJAH ASHWORTH, of the firm of ASHWORTH BROTHERS, subjects of the Queen of Great Britain and Ireland, and residing at Manchester, county of Lancaster, England, have invented certain Improvements in Driving Mechanisms for Carding-Engines, (for which we obtained a patent in Great Britain, No. 6,639, dated May 18, 1886,) of which the following is a specification.

In an application for a United States Patent filed by us October 5, 1886, Serial No. 215,386, we have described how it is desirable to impart a slow motion to both the doffer and the main cylinder during the operation of grinding, and have also described means for driving the doffer from the loose pulley of the main cylinder, and have also explained how it is desirable to then drive the main cylinder from the doffer in order that they may have corresponding surface speeds during the grinding.

Our present invention consists of improved means for driving the main cylinder from the doffer. We utilize for this purpose the side shaft, which gives motion to the feed-rollers. We provide the said shaft with a worm, and we fix a worm-wheel upon the main cylinder-shaft, or we cut or form upon a pulley or part which is fixed upon such shaft teeth, notches, or projections with which the said worm can engage. We may apply a special worm-shaft instead of using the said side shaft. The doffer may receive motion in a suitable manner—as, for example, the doffer may be driven by the parts used previously to the date of our present invention for actuating the doffer during the grinding of the main cylinder; but we prefer to actuate the said doffer when stripping or grinding by the means described in our aforesaid application, Serial No. 215,386. A grooved band-pulley, forming part of the loose pulley, which is mounted upon one end of the main cylinder-shaft or caused to revolve with such pulley, is arranged to be connected, by means of a band, with a pulley which may be formed in one piece with or be mounted to revolve with the strap-pulley, whereby the doffer is actuated during the ordinary working of the engine.

In the accompanying drawings, Figure 1 is a side elevation of a carding-engine, illustrating the means preferred for driving the doffer in accordance with our previous invention before mentioned. Fig. 2 is a plan of the same. Fig. 3 is an elevation of the upper portion of the other side of the engine, and illustrating our present improvements. Fig. 4 is a plan of the parts represented in Fig. 3. Fig. 5 shows how a special worm-shaft may be used. Fig. 6 is a sectional view illustrating a detail of the machine.

In Figs. 1 and 2, (which, as we have already said, illustrate the preferred devices for driving the doffer in accordance with our former invention,) *a* is the loose pulley, *b* being the ordinary fast pulley, whereby the cylinder A is revolved when the engine is at work. The pulley *a* is the ordinary loose pulley, with the exception that it is formed with a groove to receive a band, *c*, which drives a pulley, *d*. This pulley *d* is attached to the ordinary pulley, *i*, and as a consequence is connected with the ordinary pinion, *e*. The said pinion gears with the ordinary wheel, *f*, which is fixed upon the doffer-shaft *u*. A second pulley, *g*, is formed in one piece with the pulley *d* or is attached to it, and this second pulley drives the stripping-brush by means of a band, *h*. During the ordinary working of the engine the doffer *x* is actuated by means of a belt which drives the pulley *i*, which is a part of the ordinary arrangement and is fixed to the said pinion *e*. When the main cylinder is to be stripped, the said belt is removed from the pulley *i*, whereby the doffer *x* receives motion during the ordinary working of the engine, as aforesaid, and the band *c* is applied to connect the pulley *d* with the loose pulley *a* in the manner represented in Figs. 1 and 2. When the ordinary driving-belt, which drives the main cylinder, is shifted onto the loose pulley *a*, the doffer will be revolved, and the said belt will cease to drive the main cylinder directly. On the other side of the engine (represented in Figs. 3 and 4) the doffer-shaft *u* imparts motion to the side shaft, *k*, by means of the bevel-wheels *l*, as is usual.

This shaft is the ordinary shaft which transmits motion to the shaft *s*, which actuates the feed-rollers. Upon the main cylinder-shaft we fix a worm-wheel, *m*. In practice we form the ordinary belt-pulley, *n*, with teeth or projections, with which a worm, *o*, can engage, a special extra wheel being thereby dispensed with; but, if preferred, a wheel, *m*, may be attached to the ordinary pulley, *n*, or to its shaft. The worm *o* is mounted upon the side shaft, *k*, which actuates the feed-rollers, as aforesaid. This shaft is mounted in its bearing-brackets *p p'*, so that it can be moved laterally, as is usual, in order to withdraw the bevel-pinion *q* from gear with the wheel *r* when the feed-rollers are to be stopped. For this purpose the bearings or sockets *p* and *p'*, and more particularly the latter, are elongated, as shown in the sectional view, Fig. 6. When the gears *q r* are to be kept in engagement, the shaft *k* is held up to the inner end of the elongated sockets *p p'* by means of pins *s'*. When the pins are withdrawn, the horizontal movement of the shaft also withdraws the worm from gear with the worm-wheel *m*. When so withdrawn, the worm can be slid upon the side shaft entirely away from the wheel *m* and be kept out of the way near the bearing *p'* during the ordinary working of the engine.

Preparatory to the stripping operation we either remove the pinion *q* from the shaft, so as to stop the revolution of the feed-rollers, or we withdraw the lap from between the rollers, so as to stop the feed, so that the rollers may continue to revolve without feeding cotton to the licker-in *t*. The worm *o* is then slid along the shaft until it is in its working position, as represented in Figs. 3 and 4. The worm *o* bears against a shoulder *k'* on the shaft *k*, and the action of the worm tends to keep it up against this shoulder. The shaft is provided with a fixed key adjacent to the shoulder at the point occupied by the worm when in its operative position, so that the worm is caused to revolve with the shaft. The side shaft being shifted back to its working position, the worm *o* will gear with the wheel *m*, and all the parts will then be in order for the stripping. The driving-belt being shifted onto the loose pulley *a*, the main cylinder will cease to revolve at its working speed, but will receive a slow motion through the band *c*, pulley *d*, pinion *e*, wheel *f*, doffer-shaft *u*, bevel-gearing *l l*, side shaft, *k*, and the worm and wheel *o m*. In the modification illustrated by Fig. 5 a special worm-shaft, *v*, is employed to drive the main cylinder in place of the ordinary side shaft, *k*. This shaft *v* receives motion from the doffer-shaft by means of a worm and wheel, and gives motion to the cylinder-shaft by means of a worm and wheel, as in the case of the arrangement shown in Figs. 3 and 4, the action being exactly the same as when the ordinary side shaft, *k*, is made into a worm-shaft.

We do not confine ourselves to the method of driving the stripping-brush by means of the grooved pulley *g* and the band *h*.

We do not wish to confine ourselves to the means described for driving the doffer-cylinder, as that forms the subject of the separate application for a patent filed by us October 5, 1886, Serial No. 215,386.

We claim as our invention—

1. The combination of the main cylinder and doffer of a carding-engine with a side shaft geared to the doffer-cylinder shaft and having a worm, *o*, a worm-wheel on the main-cylinder shaft, and devices, substantially as described, for driving the doffer-shaft, all substantially as specified.

2. The combination of the main cylinder and doffer of a carding-engine with a side shaft geared to the doffer-cylinder shaft and having a worm, *o*, keyed thereto, but movable thereon, a worm-wheel on the main-cylinder shaft, and devices, substantially as described, for driving the doffer-shaft, all substantially as specified.

3. The combination of the main cylinder and doffer-cylinder of a carding-engine, a side shaft, *k*, geared to the doffer-cylinder, and having a worm, *o*, with a worm-wheel on the main cylinder, fast and loose pulleys on the main-cylinder shaft, a pulley, *k*, controlling the doffer-cylinder, and a band for connecting said loose pulley and the pulley *d*, all substantially as and for the purpose set forth.

In testimony whereof we have signed our names to this specification in the presence of two subscribing witnesses.

GEO. ASHWORTH.
ELIJAH ASHWORTH.

Witnesses:
DAVID FULTON,
JOSHUA ENTWISLE.